June 9, 1942.  W. A. ANDERSON  2,285,640
ACCOUNTING MACHINE
Filed June 29, 1938  5 Sheets-Sheet 1
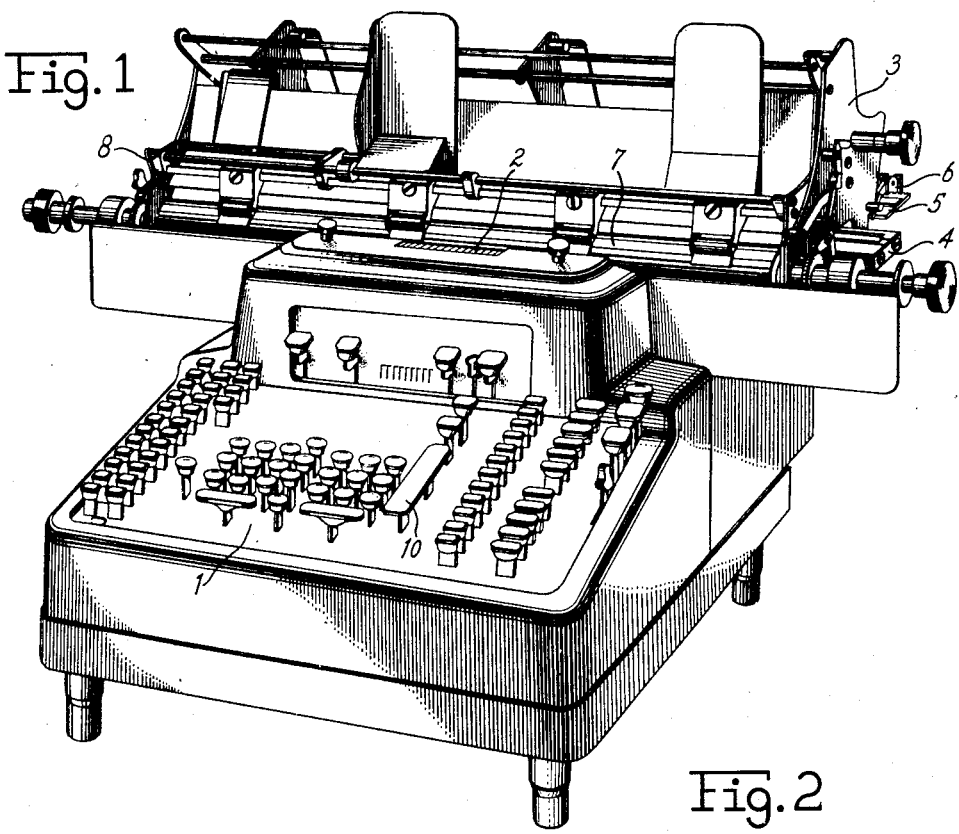
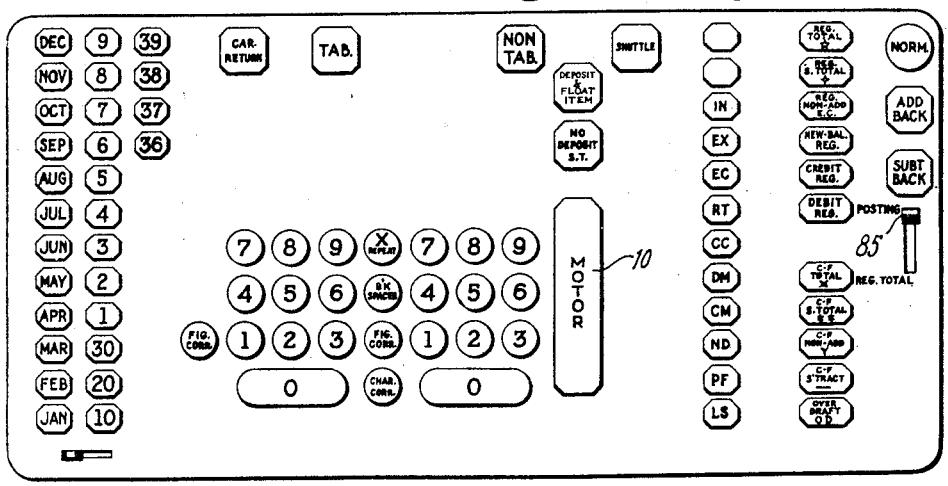
INVENTOR
WALTER A. ANDERSON
BY
ATTORNEY

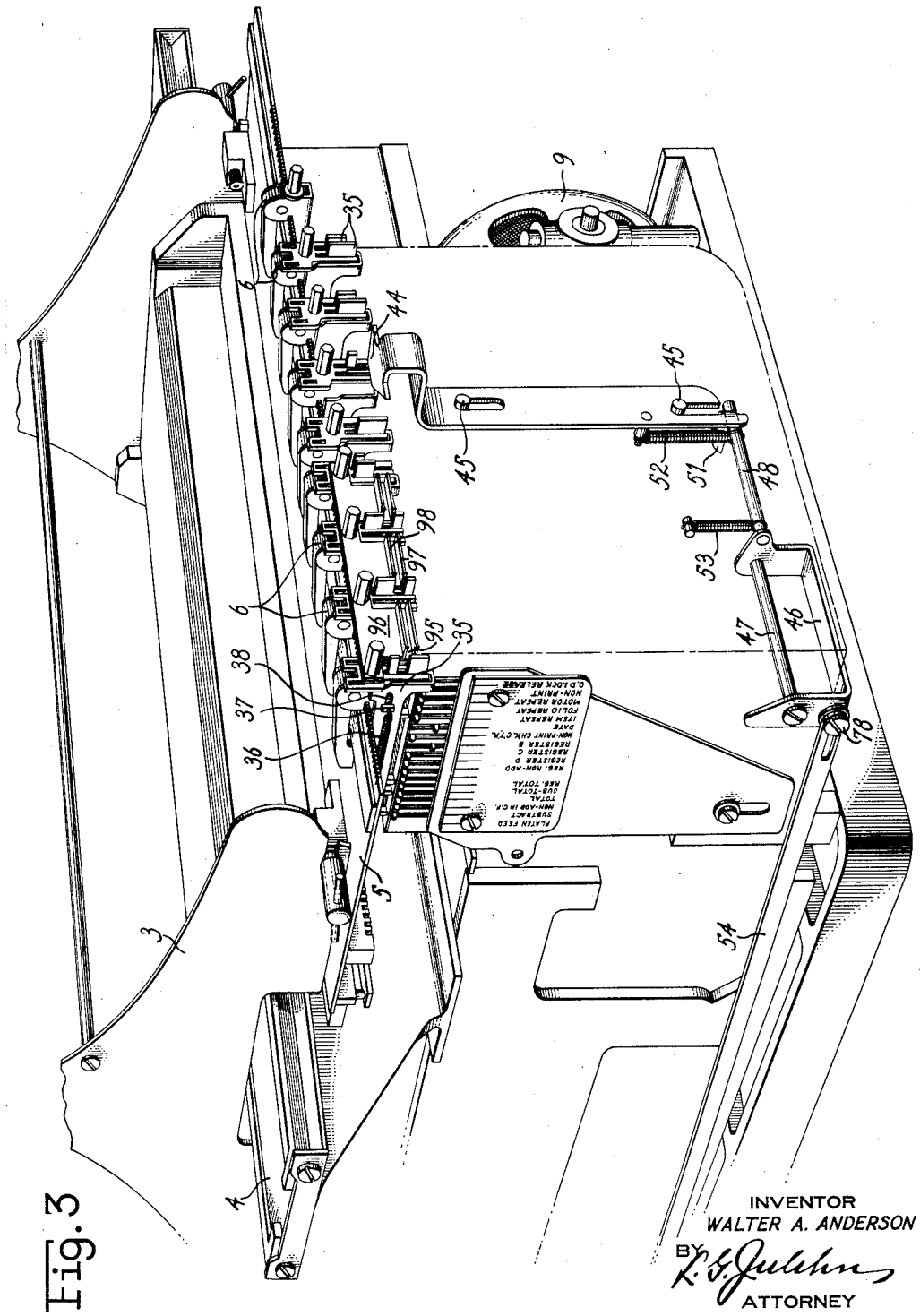

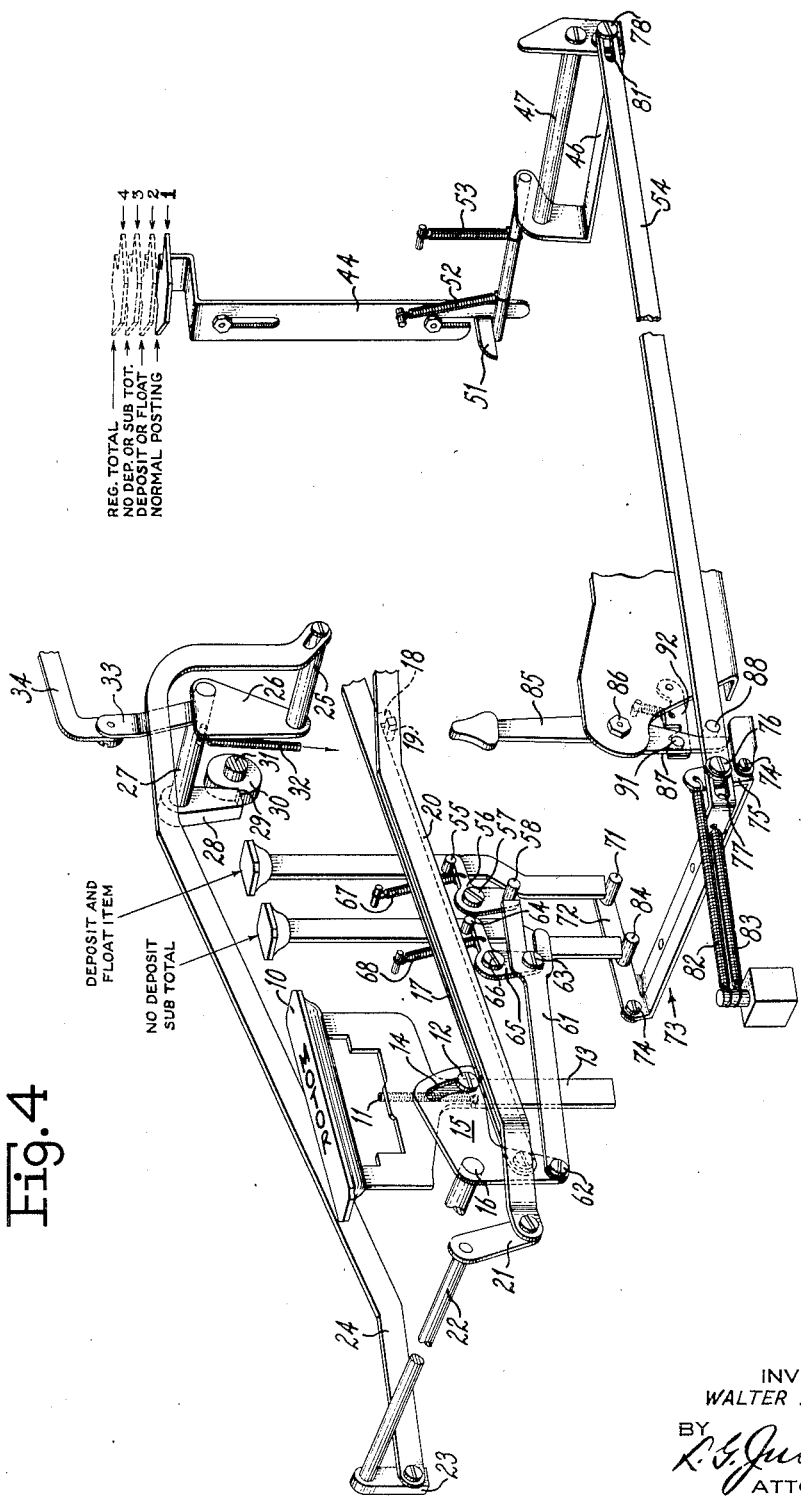

June 9, 1942.　　W. A. ANDERSON　　2,285,640
ACCOUNTING MACHINE
Filed June 29, 1938　　5 Sheets-Sheet 4

INVENTOR
WALTER A. ANDERSON
BY
ATTORNEY

Patented June 9, 1942

2,285,640

UNITED STATES PATENT OFFICE 2,285,640

ACCOUNTING MACHINE

Walter A. Anderson, Bridgeport, Conn., assignor to Underwood Elliott Fisher Company, New York, N. Y., a corporation of Delaware Application June 29, 1938, Serial No. 216,465

7 Claims. (Cl. 235—60)

This invention relates to accounting machines, and more particularly to the type of machine used in posting patrons' accounts in banking houses, although the invention is not limited to machines for performing this particular type of work.

The number of items such as checks and deposits posted on individual patrons' accounts is variable. It is customary to post one or more checks in successive columns and to post the deposit in another column. In many instances, there are fewer checks than the number of columns provided for them, and at times there are either no checks or no deposits to be recorded.

Two keys are provided to expedite tabulation of the carriage to a desired column. Depression of one of these keys effects uninterrupted tabulation through check columns to the deposit column. Depression of the other of these keys similarly effects uninterrupted tabulation from any preceding column through the deposit column to the first new balance column.

Often, a statement sheet becomes filled before all of the entries for that patron's account have been posted. In such instances, it is desirable to print a sub-total of the new balance upon the completed form instead of the usual total in order that the total may again be printed at the top of a newly inserted form and the postings continued.

Frequently a single deposit entry represents the value of a check or group of checks on out-of-town banks, drawn or endorsed to the patron. Modern banking procedure requires that a mean average of the number of days necessary to clear the check or checks be computed and printed, together with the value and number of such items on the statement. These items are commonly called "float items" and the computed record thereof is printed in a special column provided on the stub portion of the form.

It is accordingly an object of the present invention to provide a novel arrangement of the mechanism associated with the deposit key whereby when the deposit amount represents a check or a group of checks, as above described, the holding of this key in its depressed position for a predetermined time after the printing of such amount will effect the stopping of the carriage in the float item column for the listing of the computed clearance data of such deposit item, whereas in general operations the carriage will pass through this column.

Another object of the invention lies in the provision of means for retaining control mechanism associated with the deposit and no-deposit keys in effective position after the carriage reaches a certain point in its travel, so that the operator may release these keys, and thereby have the use of his hands for handling the paper while the machine is operating.

With these and incidental objects in view, the invention consists in certain novel features of construction and combinations of parts, the essential elements of which are set forth in appended claims and a preferred embodiment of which is hereinafter described with reference to the drawings which accompany and form part of this specification.

In the drawings:

Figure 1 is a perspective view of an accounting machine embodying the invention, Figure 2 is a diagrammatic view of the keyboard, Figure 3 is a perspective of the rear and part of the right side of the machine showing the automatic control mechanism on the traveling paper carriage, Figure 4 is a perspective view taken from the right front corner of the machine, and shows the mechanism for adjusting the automatic control cam, Figure 5 is a right side elevation of a control magazine with the control cam in normal or posting position, Figure 6 is a view similar to Figure 5 but with the control cam supported by the retaining means in that elevation to which it is adjusted by depression of the deposit key, Figure 7 is a view similar to a portion of Figure 6 but with the control cam supported by the retaining means in that elevation to which it is adjusted by depression of the no-deposit key.

Figure 8 is a view similar to Figure 7 but with the control cam shown in that elevation to which it is adjusted by movement of the automatic register total lever to register total position, Figure 9 is a detail perspective of a control magazine and a portion of the conventional tabular stop mechanism associated therewith, Figure 10 is a detail view of one of the selector levers operated by the carriage controls, Figures 11 and 12 are perspective views of the cam retainer rails, and Figure 13 is a diagrammatic showing of the carriage controls in all nine columns, together with a sample statement sheet.

GENERAL DESCRIPTION

This is an improvement on the machines disclosed in the application of Oscar J. Sundstrand, Serial No. 581,800, filed December 18, 1931, and my application Serial No. 92,164, filed July 23, 1936. The machine includes one crossfooter and four accumulating registers. It has a traveling paper carriage movable laterally to different columns and returned automatically from a predetermined lateral position. The carriage includes a control plate carrying a series of magazines with control lugs for automatically controlling the numerous operations that may be controlled manually by the keyboard. The carriage illustrated in the drawings is of the combined front and rear feed type. Selection of the adding registers is performed by selective depression of three keys on the right side of the keyboard. Totals are taken from the adding registers by depressing the proper selecting keys, operating the machine through a blank cycle, then depressing the register total key and again operating the machine. Sub-totals are taken from the adding registers in the same manner as totals, except that the register sub-total key is depressed instead of the total key.

Register totals may be automatically taken at the end of a series of posting operations by structure similar to that disclosed in application Serial No. 92,164.

Movable spring tensioned slides mounted on opposite sides of the carriage control magazines are arranged to be actuated by a vertically adjustable control cam. These slides, in turn, actuate the control lugs placed in the magazines to effect the desired operations of the machine in predetermined columns. Certain of these slides are provided with offset cams arranged, when moved forward, to depress the conventional carriage stop, thereby causing the carriage to skip certain columns in instances where the control cam is adjusted to an elevation for engaging such slides. The control cam is elevated different extents by the deposit and no-deposit keys and by the automatic register total lever. When this lever is in posting position, and neither of the above keys are depressed, the cam occupies its lowermost or normal position. When the cam is in this position, the carriage, as it travels from right to left on its working stroke, stops at each column except the float item position. Depression of the deposit key raises the cam one step of movement into the plane of slides on the magazines in the check columns, allowing the carriage to tabulate directly to the deposit column. Depression of the no-deposit key raises the cam two steps of movement, again into the plane of the slides on the magazines in the check columns and also in the plane of slides on the magazine in the deposit column, allowing the carriage to tabulate directly through these columns. Movement of the register total lever from posting to register total position raises the cam three steps of movement, in which position it cooperates with certain of the magazine slides to condition the machine for taking register totals automatically. In this plane, slides associated with balance printing and float item operations are engaged by the cam, causing the carriage to skip these columns. Normally, as the carriage travels from right to left on its working stroke, the control cam is free to be raised or lowered by either the no-deposit or deposit key. However, when either of these keys is held depressed until the carriage reaches a certain point, the cam is held in its moved position by supporting rails secured on the right end of the carriage. Maintenance of the cam in the position to which it is raised by depression of the deposit key causes the carriage to stop in the float item column. Maintenance of the cam in the position to which it is raised by depression of the no-deposit key effects the printing of a sub-total instead of a total in the last balance column.

DETAILED DESCRIPTION

Index of topics

Figure 5:
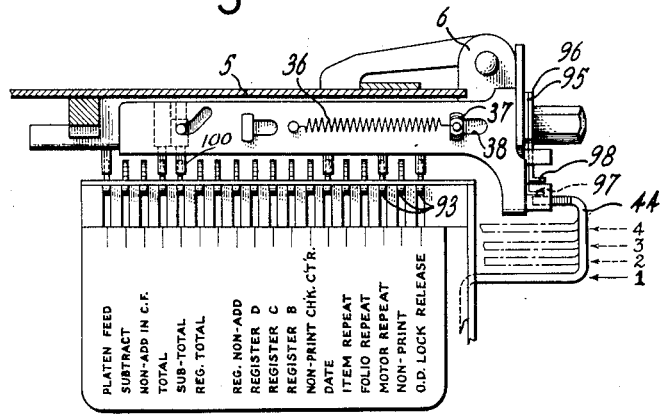
Figure 8:
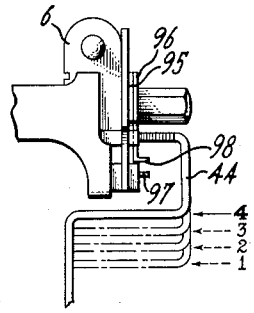

1. Machine sections and operating mechanism.
2. Carriage tabulating mechanism in general.
3. Carriage tabulation by the deposit and no-deposit keys.
4. Automatic printing of totals from registers.
5. Rails for maintaining the control cam in elevated positions after a certain point in the carriage travel is reached.
6. Taking a sub-total by prolonged depression of the no-deposit key.
7. Effecting carriage stop in float item column by sustained depression of the deposit key.
8. Terminology in the claims.

1. MACHINE SECTIONS AND OPERATING MECHANISM

Referring to Figure 1, the machine includes the customary keyboard 1, type bars 2, a laterally movable paper carriage indicated generally at 3 mounted on a track 4. The carriage has secured to it a control plate 5 carrying a plurality of control magazines 6 for automatically controlling the operations of the machine in predetermined columns. The carriage may be of the type disclosed in my co-pending application Serial No. 150,637, filed June 25, 1937. The carriage also carries the customary type of roller platen 7. Work sheets may be inserted around the platen from the rear thereof in the customary manner, and other sheets may be inserted from in front of the platen by the aid of a front feed structure 8.

The manual means for controlling such functions as selection of the registers, subtraction, non-addition, total taking and sub-total taking are located at the right side of the keyboard (Figure 2). The mechanism for performing these various operations is fully disclosed in application Serial No. 581,800. The machine is actuated by an electric motor 9 (Figure 3). The motor is started by the closing of a suitable switch mechanism (not shown) upon depression of a motor bar 10 (Figure 1). Depression of the motor bar also releases a clutch mechanism to engage the motor with the main drive shaft.

Referring to Figure 4, the motor bar 10 is mounted in the machine frame for vertical movement, and is held in its upper position by a spring 11. A stud 12 on the stem 13 of the motor bar rests normally in the bottom of a slot 14 in a lever 15 pivoted at 16 to the machine frame. A link 17 is pivoted to the lower arm of lever 15 and extends toward the rear of the machine. A shoulder 18 on link 17 lies behind a block 19 on another link 20 connected at its forward end to an arm 21 secured to a shaft 22 extending across the front of the machine. An arm 23, also secured to shaft 22, is pivoted to a link 24 connected at its rear end, by pin and slot connection, to a stud 25 secured to a plate 26 pivoted on a shaft 27. An arm 28 secured to shaft 27 normally lies above a shoulder 29 on a cam 30 secured to a release shaft 31. A spring 32 secured to plate 26 normally holds these parts in the positions shown. An arm 33 extends upwardly from plate 26 and is connected to a link 34 extending toward the rear of the machine.

Depression of the motor bar oscillates lever 15 and pulls link 17 forward. Shoulder 18 pulls link 20 forward, rocking shaft 22 and pulling link 24 and plate 26 forward against the tension of spring 32. This rotates shaft 27, removing arm 28 from shoulder 29 and moving link 34 to the rear. The removal of arm 28 from shoulder 29 engages the clutch, and the movement of link 34 starts the electric motor in the manner disclosed in application Serial No. 581,800. The starting of the motor, together with the engaging of the clutch, causes the machine to operate. The parts are returned to their normal positions at the end of the operation in the same manner as disclosed in application Serial No. 581,800.

2. CARRIAGE TABULATING MECHANISM IN GENERAL

Referring to Figure 3, the control plate 5 is attached to the rear of the paper carriage to move therewith, and carries a number of control magazines 6. Certain of these magazines are provided with control slides 35 on opposite sides thereof. These slides are mounted for sliding movement on the magazines and are tensioned by springs 36 (see also Figure 9) toward the rear of the machine, their rearward movement being limited by studs 37 extending through slots 38 in the slides. A tubular stop lever 41 (Figure 9) pivoted in the machine frame normally lies in the path of lateral movement of the forward ends of control magazines 6 to stop the paper carriage in its several columnar positions. Normally, as disclosed in application Serial No. 581,800, this lever and its associated mechanism (not shown) are operated during each machine operation to allow the carriage to advance one column. However, since it is desirable at times that one or more columns be skipped, skip cams 42 are provided on certain of the slides 35 to cooperate with a stud 43 on lever 41 to depress the lever from the path of the magazine to which the slide is attached. By this mechanism, when it is desired to skip a particular column, it is only necessary to move slide 35 for that column forward a sufficient distance to place cam 42 in alignment with stud 43. Then as the carriage enters that column, lever 41 is depressed, allowing the carriage to move to the next column without stopping. The means for moving the slide forward includes a control cam slide 44 mounted on studs 45 for vertical movement. When it is desired to move one of the slides 35 forward, it is only necessary to place cam slide 44 in the horizontal plane of that slide. Then, as the carriage travels into that column, the slide is cammed forward just before it reaches such column. Movement of cam slide 44 is controlled by a bail 46 (Figure 3) pivoted on a rod 47 and having a long stud 48 contacting the lower edge of a shoulder 51 (Figure 4) on cam slide 44. A spring 52 normally holds stud 48 in engagement with shoulder 51. From these parts it is obvious that oscillation of bail 46 will raise or lower cam slide 44 into or out of the path of slides 35. A spring 53 is connected to stud 48 and to the machine frame to urge cam slide 44 upwardly. Upward movement of the slide, however, is regulated by a link 54 extending to the front of the machine. The adjustment of these parts under control of link 54 will be explained later.

3. CARRIAGE TABULATION BY THE DEPOSIT AND NO-DEPOSIT KEYS

Two keys entitled deposit and no-deposit are provided for selective column skipping to speed the posting operations and to require less manipulation by the operator. The deposit key, when depressed, causes the machine to tabulate from any column on the left of the statement sheet (Figure 13) directly to the deposit column. This key is useful in instances where there are no checks, or fewer checks than the number of columns assigned thereto, and a deposit is to be entered. The no-deposit key causes the machine to tabulate directly from any position on the left side of the statement sheet to the spacing cycle column for preparing the machine to take the new balance. This is useful where there is no deposit. To further simplify the manipulations necessary in this work, these keys are provided with connections to the clutch release mechanism so that depression of either key will act as a motor bar. By this provision, when the amount of the old balance or check is set up on the amount keyboard, it is only necessary to depress the deposit or no-deposit key to cause the machine to enter, in the appropriate column, the amount set up in the keyboard, and to then tabulate directly to the deposit or spacing cycle column, depending upon which of the two keys is depressed. The connections for starting the machine by these keys and for skip tabulating the carriage will now be explained.

Referring to Figure 4, a stud 55 is secured to the stem of the deposit key and lies above a bell crank 56 pivoted in the machine frame at 57, and having a stud 58 lying behind the rear end of a pitman 61 pivoted at 62 to the lever 15. Pitman 61 is slidable at its rear end on a stud 63. Depression of the deposit key will thereby move pitman 61 forward and rock lever 15 to start the machine, as above explained.

A stud 64 on the stem of the no-deposit key lies above an arm of a bell crank 65 pivoted at 66 and having stud 63 secured on its lower arm. By these connections, depression of also the no-deposit key moves pitman 61 forward to rock lever 15 and start the machine. The deposit and no-deposit keys are normally held in their normal positions by springs 67 and 68 fastened to bell cranks 56 and 65 and to the frame of the machine. It will be noted that these keys have no latches to hold them depressed.

Figure 13:
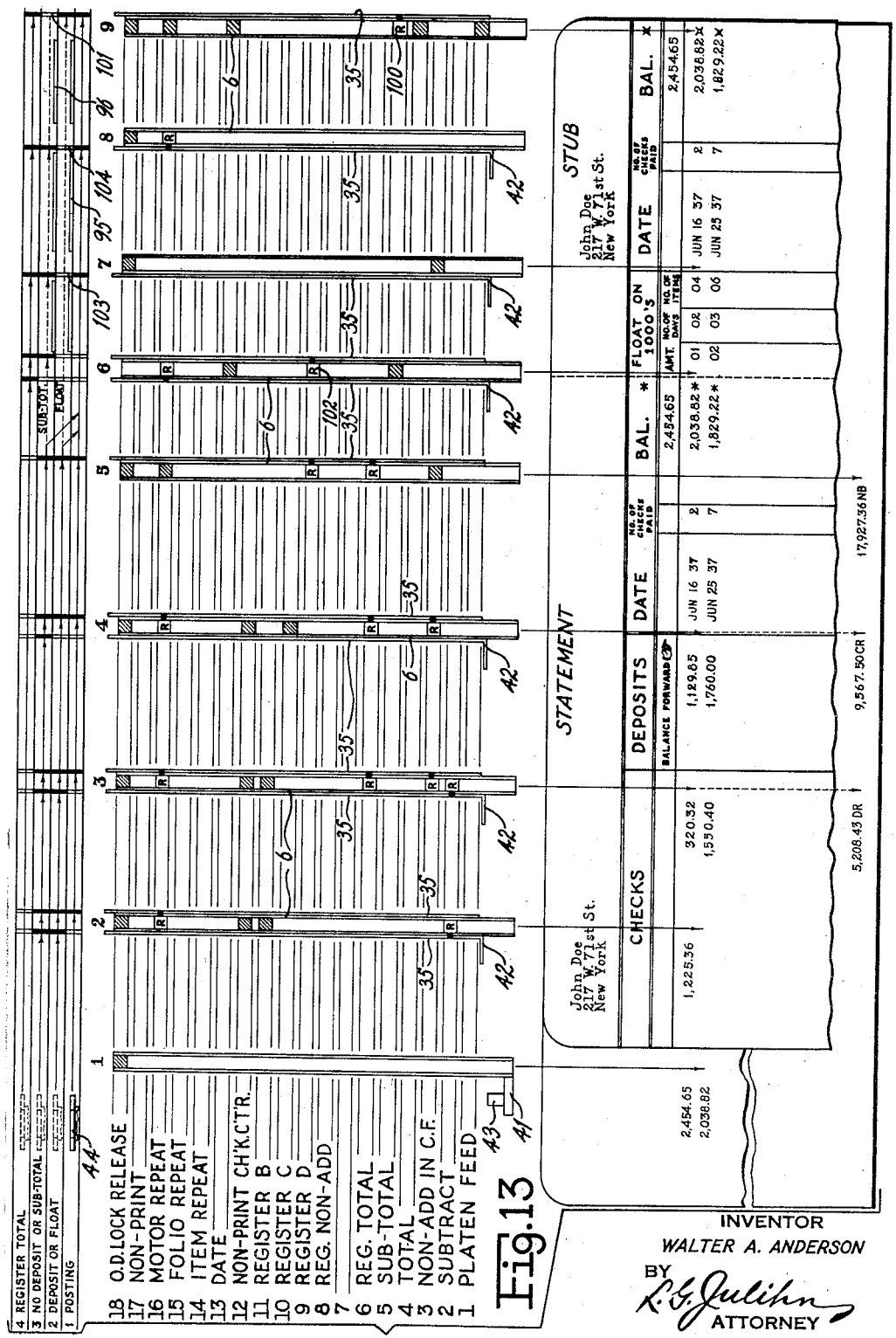

The lower end of the deposit key stem lies above a stud 71 on an arm 72 of a bail 73 pivoted at 74. An arm 75 extends upwardly from the opposite end of the bail and carries a stud 76 extending through a slot 77 in link 54. Link 54 is connected to bail 46 by a stud 78 extending through a slot 81 in the link. A spring 82 connected to the machine frame and to arm 75 normally holds arm 72 elevated and arm 75 forward. Another spring 83 normally holds link 54 forward. By these connections, depression of the deposit key moves link 54 a step to the rear, and allows spring 53 to elevate cam slide 44 from its lowest or normal position one step of movement to its number "2" position. Referring to the top of Figure 13 opposite the designation "deposit or float," it will be observed that when cam slide 44 is in this position it is lying at an elevation to be in the path of the rear ends of left and right control slides in the second and third columns. Since, as also indicated in Figure 13, the left control slides in these columns are each equipped with skip cams 42 on their forward ends, the carriage will be tabulated directly to the fourth or deposit column. By this means, when the carriage is at rest in the first column, depression of the deposit key will start the machine to enter the old balance set up on the amount keyboard, and then cause the carriage to tabulate until it reaches the deposit column, at which time the operator releases the deposit key and indexes the amount of deposit on the keyboard.

When there is no deposit to be entered, the carriage may be tabulated directly to the spacing column preparatory to printing a new balance in the first new balance column by depression of the no-deposit key. To accomplish this, a stud 84 (Figure 4) is attached to arm 72 and lies directly under the lower end of the no-deposit key stem. Since stud 84 is only about half as far from pivot 74 as is stud 71, cam slide 44 is raised about twice as far, elevating the slide to its number "3" position (Figures 4 and 13) where it lies in the path of the rear ends of left control slides 35 in the second, third and fourth columns. Since magazine 6 in the fifth column has no skip cam slide, the machine will stop in this position. As soon as the carriage stops, the operator releases the no-deposit key and allows the machine to automatically perform a blank cycle in this position and to thereafter take the new balance.

4. AUTOMATIC PRINTING OF TOTALS FROM REGISTERS

At the end of a day's posting, it is desirable for the operator to take the totals from the B, C and D accumulating registers. This operation is performed by moving the register total lever 85 (Figure 2) from its posting to its register total position and by depressing the motor bar 10. The mechanism for performing this function will now be described.

The lever 85 is pivoted at 86 (Figure 4) and has a downwardly extending arm 87 lying in front of a pin 88 on link 54. A roller 91 on arm 87 cooperates with a spring-pressed detent 92 to hold the register total lever in either of its positions. Movement of this lever to its register total position shifts link 54 a considerable distance to the rear, allowing spring 53 to elevate cam slide 44 to its highest, or number "4" position.

Referring now to Figure 13, when cam slide 44 is in its register total position, it is above, and therefore does not contact the control slides 35 on the second, third, fourth and fifth magazines. Hence, the carriage stops in each of these columns for an operation. Non-operation of the right slides 35 of these magazines allows certain of the lugs contained therein, which are normally retracted when cam 44 occupies its other positions, to remain operative and thereby condition the machine for taking totals from the B, C and D registers. Since the left control slides 35 on the sixth, seventh and eighth magazines are provided with skip cams 42 and are operated when cam 44 is elevated to register total position, these columns are skipped following the printing of the D register total in the fifth column. A cycle that is, in effect, a blank cycle, occurs in the ninth column, and the carriage then continues for a short distance toward the left, from which point it is automatically returned. The sequence of the total taking operations is as follows, reference being had to the control lug designations numbered 1 to 18 on the left of Figure 13.

Assuming the carriage is at rest in the first column, the motor bar is struck, advancing the carriage to the second column wherein the right control slide being unoperated, a motor repeat lug remains operative and causes the machine to take a blank cycle during which the B register is engaged. Following this, the carriage advances to the third column where motor repeat and register total lugs similarly remain operative and cause the total in the B register to be printed. The carriage then advances to the fourth column wherein motor repeat and register total lugs remain operative, these lugs together with a stationary C register lug causing the total in the C register to be printed, whereupon the carriage advances to the fifth column. This fifth column magazine which is normally, during posting operations, a spacing stroke magazine, is now utilized as a total taking magazine for the D register, the D register and register total retracting lugs therein remaining operative, and the stationary motor repeat lug causing the machine to cycle. Following this, the carriage skips through the sixth, seventh and eighth columns and cycles in the ninth column. The carriage is then returned for the next series of operations.

Figures 9, 11, 12:
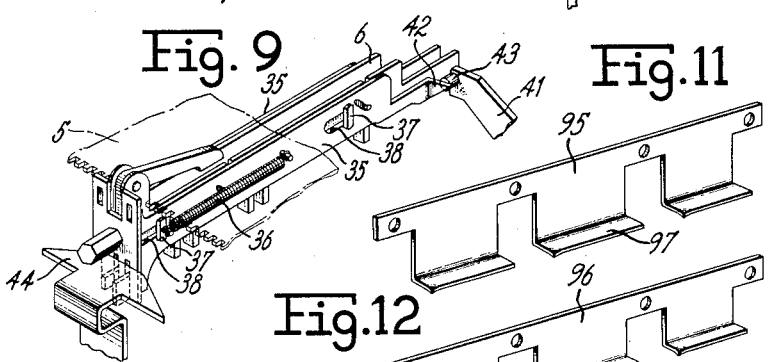

The mechanism for retracting the control lugs is illustrated in Figures 5 and 9. These figures show certain of the control lugs having pins extending from their sides and lying in small cam slots in control slide 35. It is apparent that the control lug will be retracted by forward movement of the slide.

Figure 10:
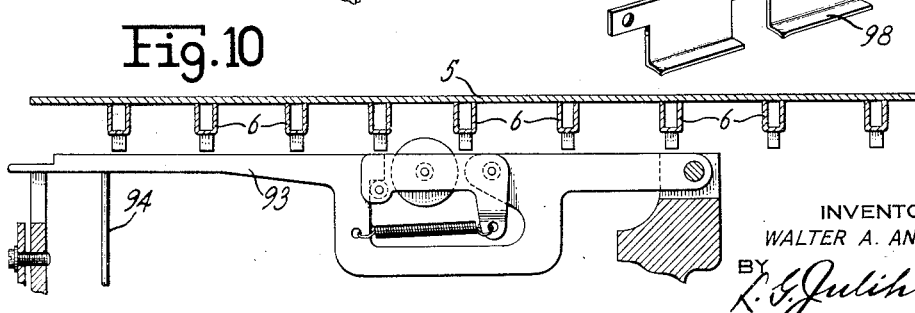

The manner in which the lugs control the machine operations is more clearly illustrated in Figure 10 where it will be observed that movement of the carriage into a columnar position causes the control lugs to depress corresponding levers, such as 93, which in turn depress corresponding rods, such as 94. These rods operate various mechanisms to control the function indicated in the eighteen control positions in Figures 5 and 13. The mechanism for so controlling the machine functions, together with details of the mountings of the movable control lugs, are fully disclosed in the above mentioned applications.

5. RAILS FOR MAINTAINING THE CONTROL CAM IN ELEVATED POSITIONS AFTER A CERTAIN POINT IN THE CARRIAGE TRAVEL IS REACHED

Figure 6:
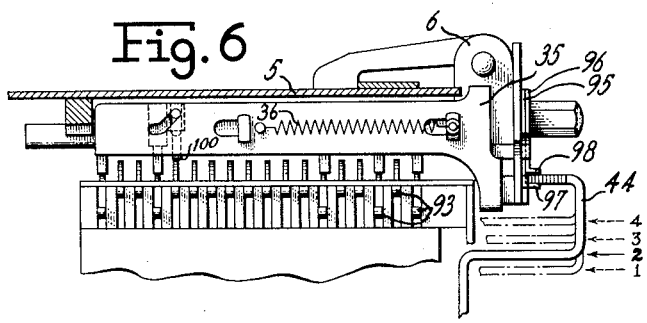
Figure 7:
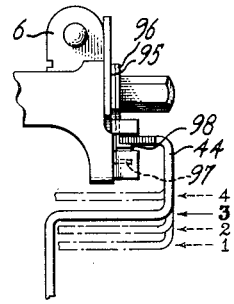

Referring to Figures 3 and 5, a pair of rails 95 and 96 have laterally extending flanges 97 and 98, respectively, and are fixed on the rear of the magazines 6 in the sixth, seventh, eighth and ninth columns. The flange 98 of the rail 96 is arranged to engage and maintain the cam 44, as shown in Figure 7, in the elevation to which it is raised by depression of the no-deposit key, when this key is held depressed as the carriage passes through the fifth column. The flange 97 of the rail 95 is arranged to similarly engage and maintain the cam 44, as shown in Figure 6, in the elevation to which it is raised by sustained depression of the deposit key after the deposit amount has been indexed and printed in the fourth (deposit) column and the carriage advanced to the fifth column. After the cam is engaged by either of these rails, the operator may release the key and thereby have the use of his hands in preparation for the removal of the printed form and the insertion of a new one. Through the use of these rails the machine continues to operate through subsequent columns, performing operations differing from those performed during operations when the same keys are depressed and released before the carriage leaves the fifth column. These different operations will now be described.

6. Taking a Sub-Total by Prolonged Depression of the No-Deposit Key

In some instances, one statement sheet accommodates all the postings to be made on one account, and in other instances, a second sheet is necessary. In the first instance, it is desirable to print a sub-total of the new balance in the second new balance column of the completed form and a total of this amount on the top of the new form in the balance forward space thereof. In the second instance, it is desirable to print sub-totals on both the completed form and the new form to eliminate a second indexing of the new balance amount before proceeding with the posting operations.

A retractable crossfooter sub-total lug 100 is provided in magazine 6 of the ninth (second new balance) column (Figure 13). This lug 100 is retracted (elevated to inoperative position) by movement of slide 35 to the left (Figure 6) by cam 44. When cam 44 is in its posting, deposit or register total elevations, slide 35 of this magazine is so moved, and therefore sub-total lug 100 is retracted so that new balances will be printed as totals in this column. When, however, the no-deposit key is held depressed until cam 44 is engaged by rail 96 and thereby maintained in its no-deposit elevation, it lies in the path of a slot 101 in slide 35 of this ninth column magazine. Hence, when the no-deposit key is so operated, slide 35 is ineffective to retract lug 100, permitting a sub-total instead of a total of the balance amount to be taken. The carriage then returns to the first column. Following this, the completed form is removed and a new form inserted. In the event that there are no immediate posting operations to follow, and it is merely desired to carry forward the amount of the new balance in order for the new form to be ready for future posting operations, the no-deposit key is again depressed, but, in this operation, is released as soon as the carriage enters the fifth column. This allows cam 44 to drop to its No. 1 position before rail 96 reaches it. The new balance is then printed first as a sub-total and then as a total, as in normal posting operations. If the transfer of the new balance is to be immediately followed by further posting operations, a sub-total is taken upon the completed form in the manner described above, a second statement sheet is inserted, and the no-deposit key is depressed and retained in that position until cam 44 engages rail 96, so that the second printing of the new balance on this sheet will be a sub-total instead of a total. The balance, therefore, remains in the crossfooter, so that subsequent posting operations may be performed without necessitating indexing of this intermediate balance.

New balance amounts are accumulated in the D register by virtue of a lug 102 in the magazine in column 6. It will be apparent that unless this lug is rendered ineffective during these operations where the balance is carried forward from one sheet to the next, the balance will be entered in this register twice instead of once. To prevent this, the right lug control slide 35 of this magazine is arranged to retract lug 102 when cam 44 is maintained in its no-deposit elevation after the carriage has traveled through the fifth column.

7. Effecting Carriage Stop in "Float Item" Column by Sustained Depression of the Deposit Key As before stated, a deposit amount frequently represents a single check or group of checks on an out-of-town bank. In such instances it is desirable to have a listing of computed clearance data recorded in the "float item" column provided in a stub portion of the statement form. Since these "float item" entries are made on only a portion of the accounts, it is desirable to have the carriage stop in this column in some instances, and tabulate through it in others. The magazine 6 (Figure 13) in the seventh or "float item" column is provided with a slide 35 having a skip cam 42 on the forward end thereof. The rear end of this slide is provided with a slot 103 which lies in the path of the control cam 44 when the cam is moved to its deposit elevation. When cam 44 is so elevated by depression of the deposit key and maintained in such position by rail 95, slide 35 is not moved forward and the carriage stops in this column for the listing of the "float item" data. In other elevations, viz., posting, no-deposit and register total, cam 44 contacts this slide and, consequently, effects the skipping of this seventh column.

When the deposit amount is of the character which requires the listing of "float item" data, the operator depresses the deposit key at the fourth (deposit) column after the amount of the deposit has been indexed in the keyboard and holds the key depressed until the machine cycles in, and tabulates past the fifth column, at which time cam 44 will have been engaged by rail 95.

In these operations where the carriage is stopped in the "float item" column it is necessary, after operating in this column, to take a spacing stroke before the new balance is printed on the statement stub. The magazine in the eighth column is provided to accomplish this. A control slide 35, similar to the control slide of the "float item" magazine, is provided on this eighth column magazine and is provided with a skip cam 42 at its forward end and a slot 104 similar to slot 103 at its rear end. When cam 44 occupies its posting, no-deposit and register total elevations, this slide is operated, and thereby effects the skipping of this column. When, however, cam 44 is in its deposit elevation, and the carriage enters this eighth column, slide 35 is not operated, permitting its retractable motor repeat lug to remain operative and thereby initiate a spacing cycle. After this, the total is taken from the crossfooter, as in other posting operations.

It will be noted that by the provision of rails 95 and 96, the operator is relieved of the necessity of holding the deposit and no-deposit keys depressed after the carriage reaches the sixth column. This arrangement lessens the time required for manipulation of the machine, and thereby gives the operator more time for handling the paper.

8. Terminology in the Claims

In the claims to follow, the terms "function controlling elements," "means for controlling the machine in its operation," or terms of similar import, refer to the parts such as 35, 93, 94, 100, etc., that condition the machine to perform certain functions during the ensuing operation. These functions may be any one or more of those enumerated at 1 to 18 on the left of Fig. 13. The terms "to control the machine differently," "to alter the character of the machine operation," or terms of similar import, refer to the operation of the machine so that it will, in the ensuing operation, not repeat the functions performed during the preceding operation, but will vary them, either by performing a greater or smaller number of functions, or by performing the same number of, but different functions. When these terms are used, it is applicant's intention that he does not wish them to be limited to any specific machine function or functions.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described, a traveling carriage arranged for tabulation to a plurality of columnar positions, means, including an adjustable member mounted on a stationary part of the machine, for controlling tabulation of the carriage to the different columnar positions, a manipulative means for controlling adjustment of the adjustable member, and means rigidly secured on the carriage to retain the adjustable member in adjusted position during travel of the carriage from one columnar position to the other.

2. In a machine of the class described, a carriage movable to a plurality of columnar positions, means, including parts on the carriage, to alter the character of the machine operations in the different columnar positions, adjustable means carried by a stationary part of the machine and adapted to cooperate with the altering means, a manipulative means for controlling adjustment of the adjustable means, and means on the carriage for maintaining the adjustable means in an adjusted position while the carriage passes through the plurality of columnar positions.

3. In a machine of the class described, a traveling carriage arranged for tabulation to a plurality of columnar positions, means, including an adjustable member, for controlling tabulation of the carriage to the different columnar positions, and means, moving in coordination with the carriage and relatively to the adjustable member, for maintaining the said member in adjusted position while the carriage is moving between two columnar positions.

4. In a machine of the class described, a traveling carriage arranged for tabulation to a plurality of columnar positions, means, including an adjustable member, for controlling the machine in its operation in the different columnar positions, a key, mounted on a stationary part of the machine, for moving the adjustable member to its adjusted position, and a rail secured to and moving with the carriage to maintain the adjustable member in adjusted position.

5. In a machine of the class described, a traveling carriage, function controlling elements thereon, an adjustable member cooperating therewith, keys whereby the adjustable member may be adjusted to different positions, and rails traveling with the carriage and lying in position to maintain the adjustable member in adjusted position.

6. In a machine of the class described, a traveling carriage arranged for tabulation to a plurality of columnar positions, function controlling elements thereon, an adjustable member adapted to cooperate with the said elements as the carriage is tabulated to the said columnar positions, and a rail secured to the carriage and lying adjacent portions of the controlling elements and in position to maintain the adjustable member in one adjusted position while the carriage travels through the said columnar positions.

7. In a machine of the class described, a traveling carriage arranged for tabulation to a plurality of columnar positions, means, including an adjustable member, for controlling tabulation of the carriage to the different columnar positions, manipulative means for controlling adjustment of the member, means for normally restoring the adjustable member to its original position as soon as the manipulative means is released, and means, cooperating with the adjustable member, for maintaining the adjustable member in adjusted position during travel of the carriage through a plurality of columnar positions that are reached after the manipulative means is released, when operation of the manipulative means is prolonged until the carriage reaches a predetermined point.

WALTER A. ANDERSON.